(12) United States Patent
Chang (10) Patent No.: US 7,740,374 B2
(45) Date of Patent: *Jun. 22, 2010

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 2 days.

This patent is subject to a terminal disclaimer.

(21) Appl. No.: 11/874,918

(22) Filed: Oct. 19, 2007

(65) Prior Publication Data

US 2008/0266880 A1 Oct. 30, 2008

(30) Foreign Application Priority Data

Apr. 20, 2007 (CN) .......................... 200710200534

(51) Int. Cl.
*F21V 5/00* (2006.01)
(52) U.S. Cl. .................. 362/240; 362/243; 362/246; 362/330
(58) Field of Classification Search .................. 362/26, 362/27, 29, 30, 240, 241, 242, 243, 244, 362/246, 606, 607, 617, 619, 623, 625, 330, 362/333
See application file for complete search history.

(56) References Cited

U.S. PATENT DOCUMENTS

| 6,964,497 | B2 * | 11/2005 | Greiner | 362/241 |
| 7,160,016 | B2 * | 1/2007 | Yu et al. | 362/617 |
| 2007/0002552 | A1 * | 1/2007 | Tseng | 362/29 |
| 2007/0086179 | A1 * | 4/2007 | Chen et al. | 362/27 |
| 2007/0147073 | A1 * | 6/2007 | Sakai et al. | 362/607 |
| 2008/0266878 | A1 * | 10/2008 | Chang | 362/330 |
| 2009/0021947 | A1 * | 1/2009 | Chang | 362/333 |

* cited by examiner

*Primary Examiner*—Y My Quach Lee
(74) *Attorney, Agent, or Firm*—Frank R. Niranjan (57) ABSTRACT

An exemplary optical plate includes one or more transparent plate unit. The transparent plate unit includes a light output surface, a bottom surface, a plurality of spherical depressions, a plurality of enclosing V-shaped protrusions, and one or more lamp-receiving portion. The light output surface is opposite to the bottom surface. The spherical depressions are formed on the light output surface. The enclosing V-shaped protrusions are formed on the bottom surface. The lamp-receiving portion is defined in the bottom surface. A backlight module using the present optical plate is also provided.

18 Claims, 10 Drawing Sheets

OPTICAL PLATE AND BACKLIGHT MODULE USING THE SAME

CROSS-REFERENCE TO RELATED APPLICATIONS

This application is related to twenty two co-pending U.S. patent applications, which are: applications Ser. Nos. 11/835,425, 11/835,426, 11/835,427, 11/835,428, 11/835,429, 11/835,430, and 11/835,431, filed on Aug. 8, 2007, and all entitled "OPTICAL PLATE AND BACKLIGHT MODULE USING THE SAME", application Ser. No. 11/836,799 filed on August 10, and entitled "OPTICAL PLATE AND BACKLIGHT MODULE USING THE SAME", application Ser. No. 11/842,170, filed on Aug. 21, 2007, and entitled "OPTICAL PLATE AND BACKLIGHT MODULE USING THE SAME", applications Ser. No. 11/843,669 and Ser. No. 11/843,670, filed on Aug. 23, 2007, and both entitled "OPTICAL PLATE AND BACKLIGHT MODULE USING THE SAME", application Ser. No. 11/845,100, filed on Aug. 27, 2007, and entitled "OPTICAL PLATE AND BACKLIGHT MODULE USING THE SAME", applications Ser. Nos. 11/845,790, 11/845,792, 11/845,793, and 11/845,794, filed on Aug. 28, 2007, all entitled "OPTICAL PLATE AND BACKLIGHT MODULE USING THE SAME"applications Ser. No. 11/850,040 and Ser. No. 11/850,041, filed on Sep. 5, 2007, both entitled "OPTICAL PLATE AND BACKLIGHT MODULE USING THE SAME", applications Ser. No. 11/861,310 and Ser. No. 11/861,311, filed on Sep. 26, 2007, both entitled "OPTICAL PLATE AND BACKLIGHT MODULE USING THE SAME", application Ser. No. 11/862,203, filed on September 27, and entitled "OPTICAL PLATE AND BACKLIGHT MODULE USING THE SAME", and application Ser. No. 11/874,919, filed on Oct. 19, 2007, and entitled "OPTICAL PLATE AND BACKLIGHT MODULE USING THE SAME". In all these co-pending applications excepting application Ser. No. 11/845,790, the inventor is Shao-Han Chang. In application Ser. No. 11/845,790, the inventor is Shao-Han Chang and Fen Chen. All of the co-pending applications have the same assignee as the present application. The disclosures of the above identified applications are incorporated herein by reference.

BACKGROUND OF THE INVENTION

1. Field of the Invention

The present invention relates to an optical plate for use in a backlight module, and the backlight module typically employed in a liquid crystal display (LCD).

2. Discussion of the Related Art

In a liquid crystal display device, liquid crystal is a substance that does not itself illuminate light. Instead, the liquid crystal relies on light received from a light source to display data images. In the case of a typical liquid crystal display device, a backlight module powered by electricity supplies the needed light.

Figure 10:
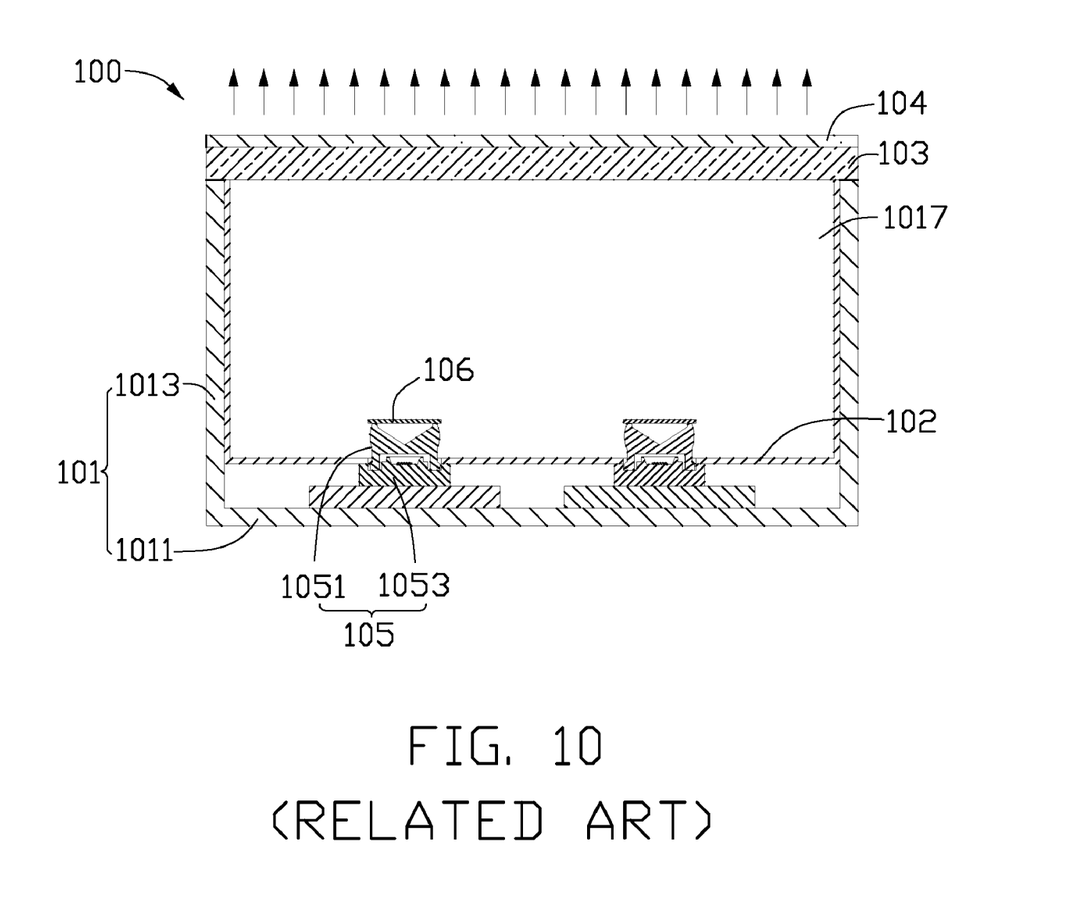
FIG. 10 is a side cross-sectional view of a conventional backlight module.

FIG. 10 represents a typical direct type backlight module 100. The backlight module 100 includes a housing 101, a light reflective plate 102, a light diffusion plate 103, a prism sheet 104, and a plurality of light emitting diodes 105 (hereinafter called LEDs). The housing 101 includes a rectangular base 1011 and four sidewalls 1013 extending around a periphery of the base 1011. The base 1011 and the four sidewalls 1013 cooperatively define a chamber 1017. Each LED 105 includes a base portion 1053 and a light-emitting portion 1051 positioned on the base portion 1053. The LEDs 105 are electrically connected to a printed circuit board (not labeled), and the printed circuit board is fixed to the base 1011 of the housing 101. The light reflective plate 102 is positioned on the LEDs 105 in the chamber 1017. The light reflective plate 102 defines a plurality of through holes (not labeled) that allows the light-emitting portions 1051 of the LEDs 105 to pass through and to emit light to be transmitted to the light diffusion plate 103. The light diffusion plate 103 and the prism sheet 104 are stacked in that order on the chamber 1017. Light emitted from the LEDs 105 is substantially reflected by the light reflective sheet 102 to enter the light diffusion plate 103, and diffused uniformly in the light diffusion plate 103, and finally surface light is outputted from the prism sheet 104.

Generally, a plurality of dark areas may occur because of the reduced intensity of light between adjacent LEDs 105. In the backlight module 100, each LED 105 further includes a reflective sheet 106 positioned on the top of the light-emitting portion 1051, configured for decreasing the brightness of a portion of the backlight module 100 above the LED 105. As a result, the brightness of the backlight module 100 is still not uniform. One method of enhancing the uniformity of brightness of the backlight module 100 is to increase the space between the light diffusion plate 103 and the LEDs 105. This increase in space tends to eliminate potential dark areas. However, increasing the space between the diffusion plate 103 and the LEDs 105 will also increase the thickness of the backlight module and further the overall intensity of the output light rays is reduced.

What is needed, therefore, is a new optical plate and a backlight module using the optical plate that can overcome the above-mentioned shortcomings.

SUMMARY

An optical plate according to a preferred embodiment includes one or more transparent plate unit. The transparent plate unit includes a first surface, a second surface, a plurality of enclosing V-shaped protrusions, a plurality of spherical depressions and a lamp-receiving portion. The second surface is opposite to the first surface. The enclosing V-shaped protrusions are formed on the first surface. The spherical depressions are formed in the second surface. The lamp-receiving portion is defined in at least one of the first surface and the second surface.

A backlight module according to a preferred embodiment includes a housing, one or more point light source, one or more reflective member, an optical plate, and a light diffusion plate. The housing includes a base and a plurality of sidewalls extending around a periphery of the base, the base and the sidewalls cooperatively forming an opening. The point light source is positioned on the base and has a light-emitting portion. The reflective member is positioned above the top portion of the light-emitting portion of the corresponding point light source. The same optical plate as described in the previous paragraph is employed in this embodiment. The light-emitting portion of the point light source is inserted in the lamp-receiving portion of the optical plate correspondingly. The light diffusion plate is positioned on the housing over the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
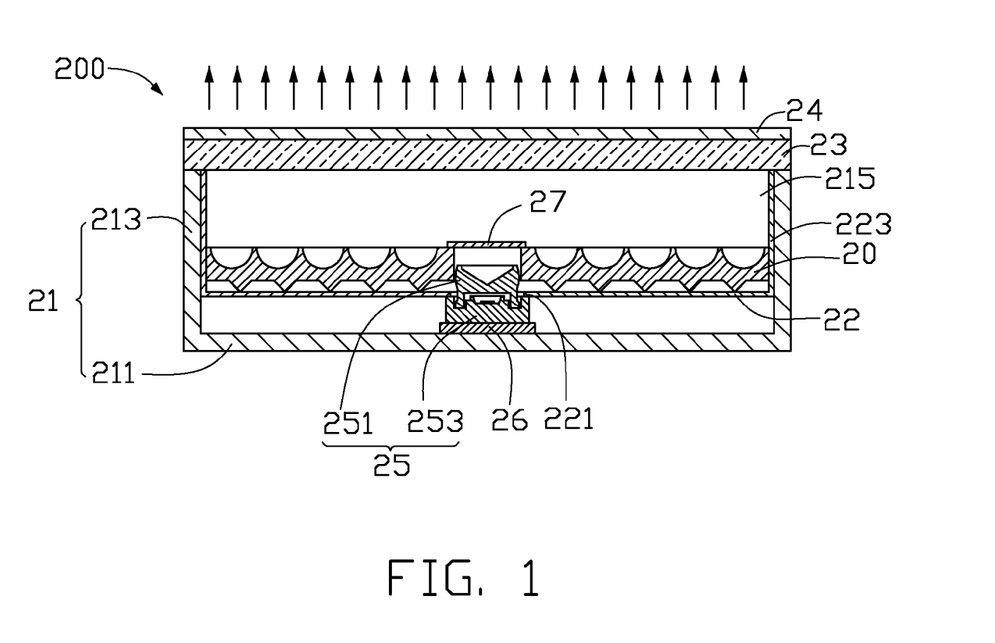
FIG. 1 is a side cross-sectional view of a backlight module according to a first preferred embodiment of the present invention.

Referring to FIG. 1, a backlight module 200 in accordance with a first preferred embodiment of the present invention is shown. The backlight module 200 includes a housing 21, a light reflective plate 22, a light diffusion plate 23, a light-emitting diode (LED) 25, a reflective member 27, and an optical plate 20. The housing 21 includes a rectangular base 211 and four sidewalls 213 extending from a periphery of the base 211, the base 211 and the sidewalls 213 cooperatively forming an opening 215. The optical plate 20, the light reflective plate 22, and the LED 25 are received in the housing 21. The light diffusion plate 23 is positioned on the housing 21 over the opening 215.

Figure 2:
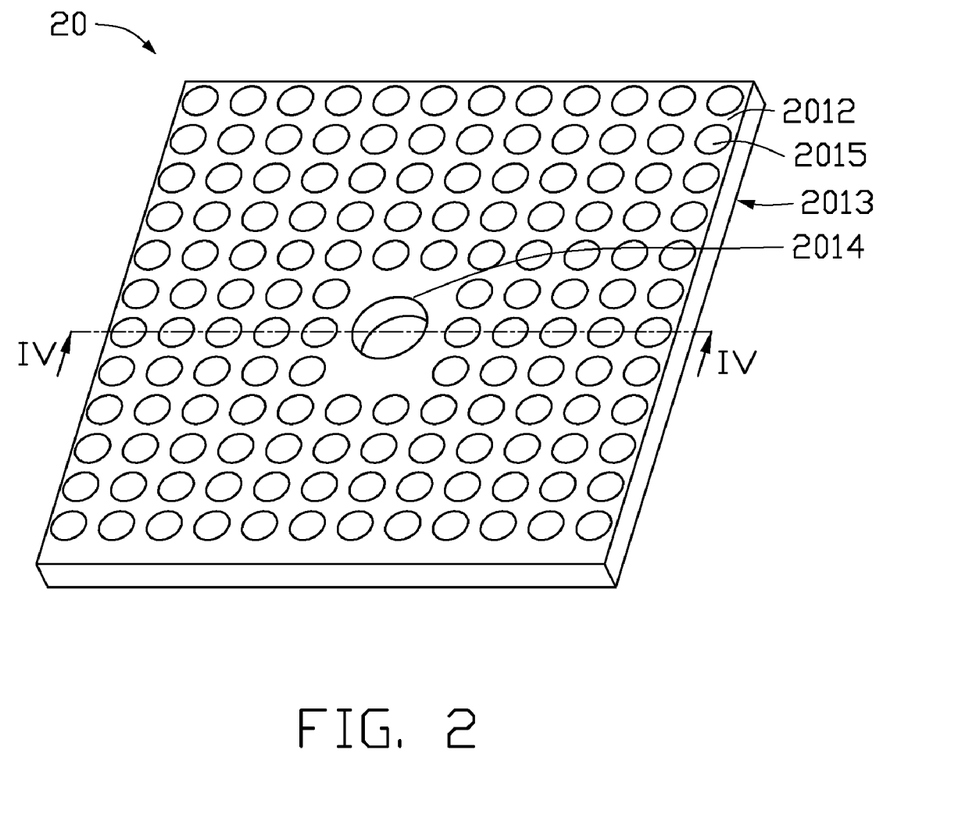
FIG. 2 is an isometric view of the optical plate of FIG. 1.
Figure 3:
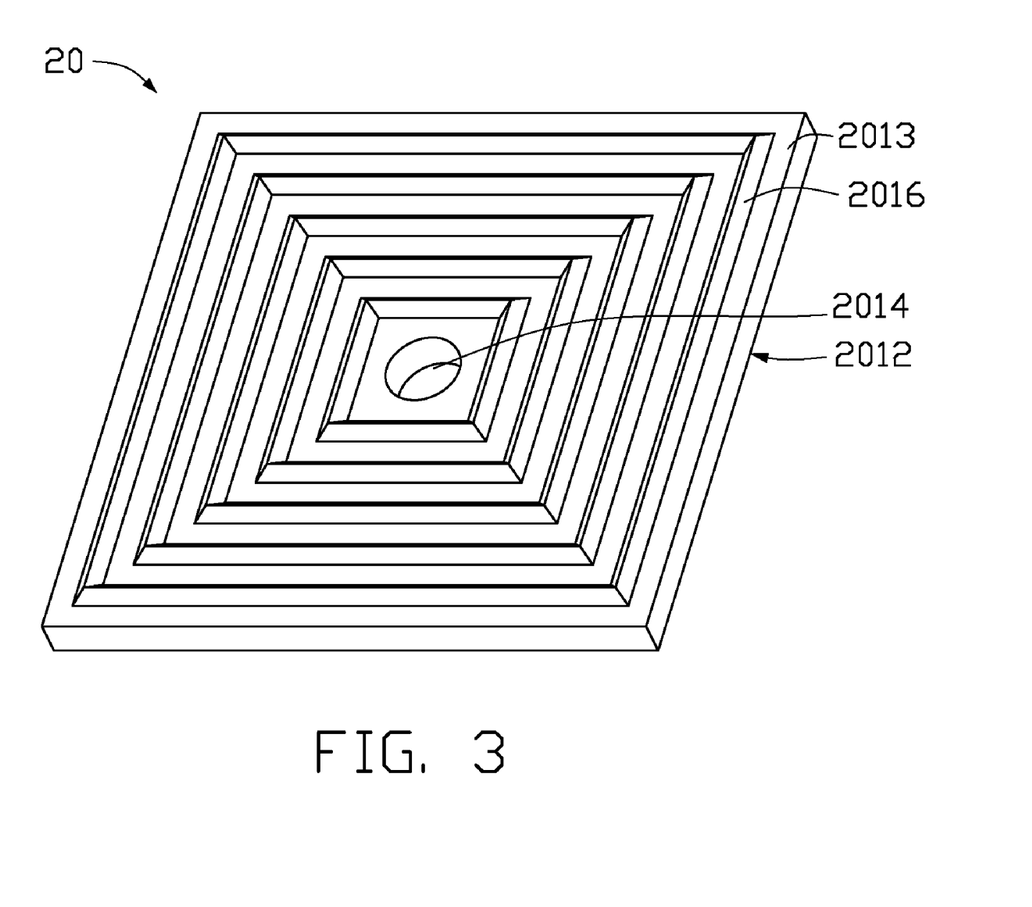
FIG. 3 is similar to FIG. 2, but viewed from another aspect.
Figure 4:
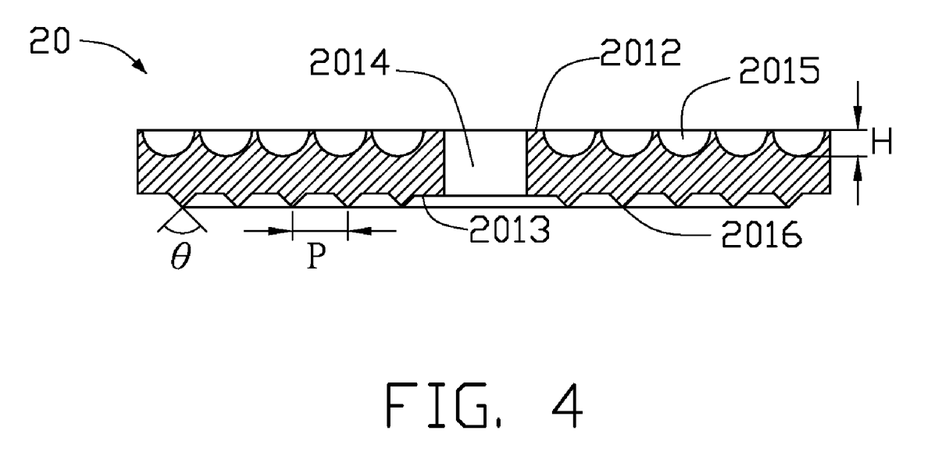
FIG. 4 is a side cross-sectional view taken along line IV-IV of FIG. 2.

Referring to FIGS. 2 through 4, the optical plate 20 is a transparent plate that can be mounted into the housing 21. The optical plate 20 includes a light output surface 2012 (shown in FIG. 2) and a bottom surface 2013 (shown in FIG. 3) on another side of the optical plate 20 opposite to the light output surface 2012. A plurality of spherical depressions 2015 are formed on the light output surface 2012. A plurality of square protrusions 2016 are formed on the bottom surface 2013. The square protrusion 2016 has a triangular structure on a cross section of a plane. The optical plate 20 further includes a lamp-receiving portion 2014 defined in the bottom surface 2013. In the first preferred embodiment, the lamp-receiving portion 2014 is defined at a center of the optical plate 20 and is a through hole that communicates between the light output surface 2012 and the bottom surface 2013. The square protrusion 2016 forms square wall surrounding the lamp-receiving portion 2014 of the bottom surface 2013. Each of the four sides of the square protrusion 2016 is substantially an elongated prism protruding out of the bottom surface 2013. A center of each of the square protrusion 2016 is located at the lamp-receiving portion 2014. The square protrusions 2016 are parallel to each other and a perimeter of each of the square protrusions 2016 increases with increasing distance from the lamp-receiving portion 2014. The spherical depressions 2015 are distributed on the light output surface 2012 surrounding the lamp-receiving portion 2014 in a manner forming a rectangle around the lamp-receiving portion 2014.

In the first preferred embodiment, a radius defined by each spherical depression 2015 is preferably in a range from about 0.01 millimeters to about 2 millimeters. A maximum depth H of each spherical depression 2015 is in a range from about 0.01 millimeters to about 2 millimeters. The square protrusions 2016 are arranged at predetermined intervals. Likewise, a pitch P of adjacent square protrusions 2016 is configured to be in a range from about 0.025 millimeters to about 2 millimeters. Also referring to FIG. 4, a vertex angle θ of the triangular structure of each of the square protrusions 2016 is configured to be in a range from about 60 degrees to about 120 degrees.

The optical plate 20 can be made from material selected from the group consisting of polycarbonate (PC), polymethyl methacrylate (PMMA), polystyrene (PS), copolymer of methylmethacrylate and styrene (MS), and any suitable combination of those. A thickness of the optical plate 20 is preferably in a range from 0.5 millimeters to about 5 millimeters.

Referring to FIG. 1 again, the LED 25 includes a base portion 253, a light-emitting portion 251 positioned on the base portion 253. The LED 25 is electrically connected to a printed circuit board 26 that is fixed to the base 211 of the housing 21. In the first preferred embodiment, the reflective member 27 is a light reflective sheet that is positioned above the top of the light-emitting portion 251. In an alternative embodiment, the reflective member 27 can be a light reflective film formed on the top of the light-emitting portion 251 or on the optical plate 20 above the lamp-receiving portion 2014.

The light-emitting portion 251 of the LED 25 is inserted into the lamp-receiving portion 2014 of the optical plate 20, and the light output surface 2012 of the optical plate 20 faces the light diffusion plate 23. The light reflective plate 22 defines a through hole 221 in a base of the light reflective plate 22. The through hole 221 corresponds to the lamp-receiving portion 2014 of the optical plate 20. The light reflective plate 22 is positioned on the bottom surface 2013 of the optical plate 20 with the light-emitting portion 251 of the LED 25 passing through the through hole 221 of the light reflective plate 22 correspondingly. The light reflective plate 22 and the optical plate 20 are supported by the base portion 253 of the LED 25.

In use, light emitted from the light-emitting portion 251 of the LED 25 enters the optical plate 20 via inner surface of the lamp-receiving portion 2014. A significant amount of the light is transmitted through the optical plate 20. Since the surfaces of the square protrusions 2016 are slanted, incident light that may have been internally reflected on a flat surface, are refracted by the slanted surfaces of the square protrusions 2016. As a result, a great amount of light is able to be outputted, from the light output surface 2012, faster.

In addition, the spherical depressions 2015 can condense and collimate light exiting from the light output surface 2012, thereby improving a light illumination brightness. Furthermore, because the LED 25 is positioned in the lamp-receiving portion 2014, light is uniformly outputted from the light output surface 2012 of the optical plate 20. Light from the optical plate 20 can be further substantially mixed in a chamber defined between the optical plate 20 and the light diffusion plate 23 before passing through the light diffusion plate 23 as uniform surface light. A distance from the LED 25 to the light diffusion plate 23 may be configured to be very small, with little or no potential risks of having dark areas on the portion of the backlight module 200 directly above the LED 25. Accordingly, the backlight module 200 can have a compact configuration while still providing good, uniform optical performance.

It should be pointed out that, the light reflective plate 22 can be omitted. In an alternative embodiment, a high reflective film can be deposited on inner surfaces of the base 211 and the sidewalls 213 of the housing 21. In other alternative embodiments, the housing 21 can be made of metal materials, thus the housing 21 has high reflective inner surface.

It is to be understood that, in order to improve a brightness of the backlight module 200 within a specific range of viewing angles, the backlight module 200 can further include a prism sheet 24 positioned on the light diffusion plate 23. In addition, in order to improve light energy utilization rate of the backlight module 200, the light reflective plate 22 can further include four reflective sidewalls 223 extending around a periphery thereof and contacting with the sidewalls 213 of the housing 21.

Figure 5:
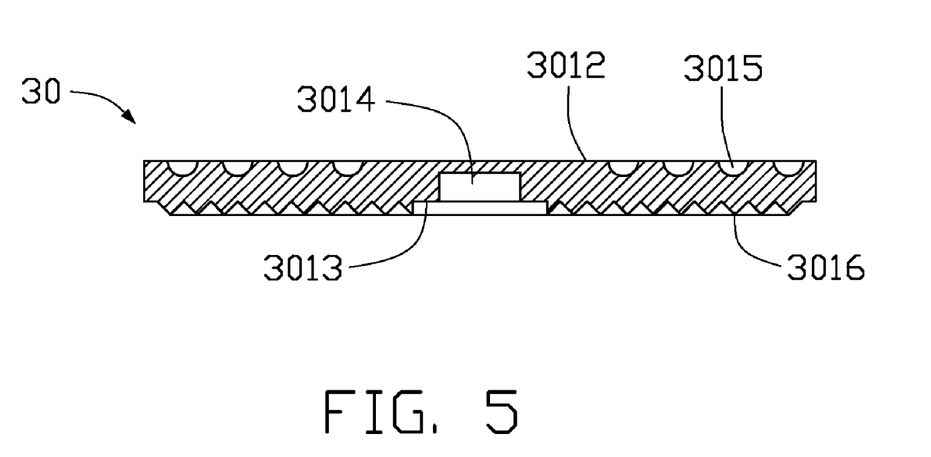
FIG. 5 is a side cross-sectional view of an optical plate according to a second preferred embodiment of the present invention.

Referring to FIG. 5, an optical plate 30 in accordance with a second preferred embodiment is shown. The optical plate 30 is similar in principle to the optical plate 20, except that a lamp-receiving portion 3014 of the optical plate 30 is a blind hole. It should be pointed out that, a LED including a reflective member positioned above the top of the light-emitting portion can be mounted into the lamp-receiving portion 3014 of the optical plate 30 to form a backlight module. Alternatively, a reflective member of the LED can be also positioned on a part of the optical plate 30 above the lamp-receiving portion 3014.

Figure 6:
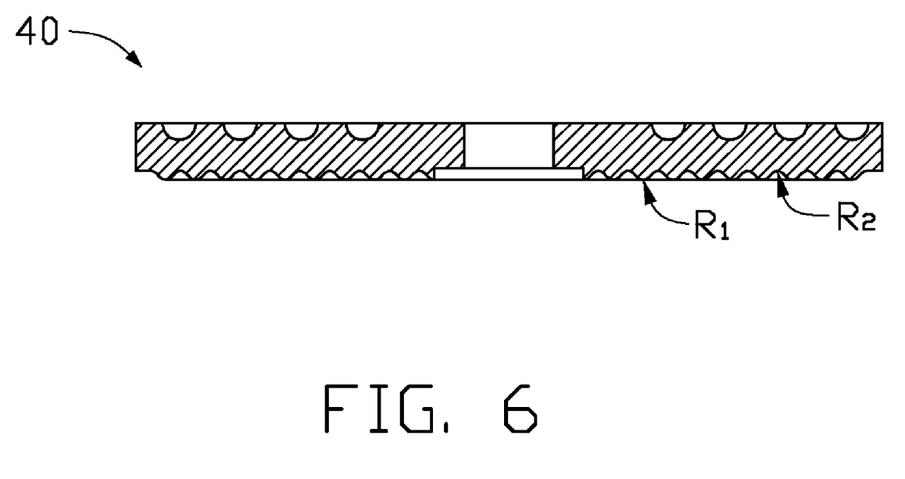
FIG. 6 is a side cross-sectional view of an optical plate according to a third preferred embodiment of the present invention.

Referring to FIG. 6, an optical plate 40 in accordance with a third preferred embodiment is shown. The optical plate 40 is similar in principle to the optical plate 20, except that either a top edge of each square protrusion or a bottom edge defined by the boundary formed by the bases of adjacent square protrusions are rounded. The curvature of this rounded surface is defined by a sphere of Radius R. The radius $R_1$ of the rounded top edge and the radius $R_2$ of the rounded bottom edge is equal to or less than 1.1 millimeters, and greater than zero.

Figure 7:
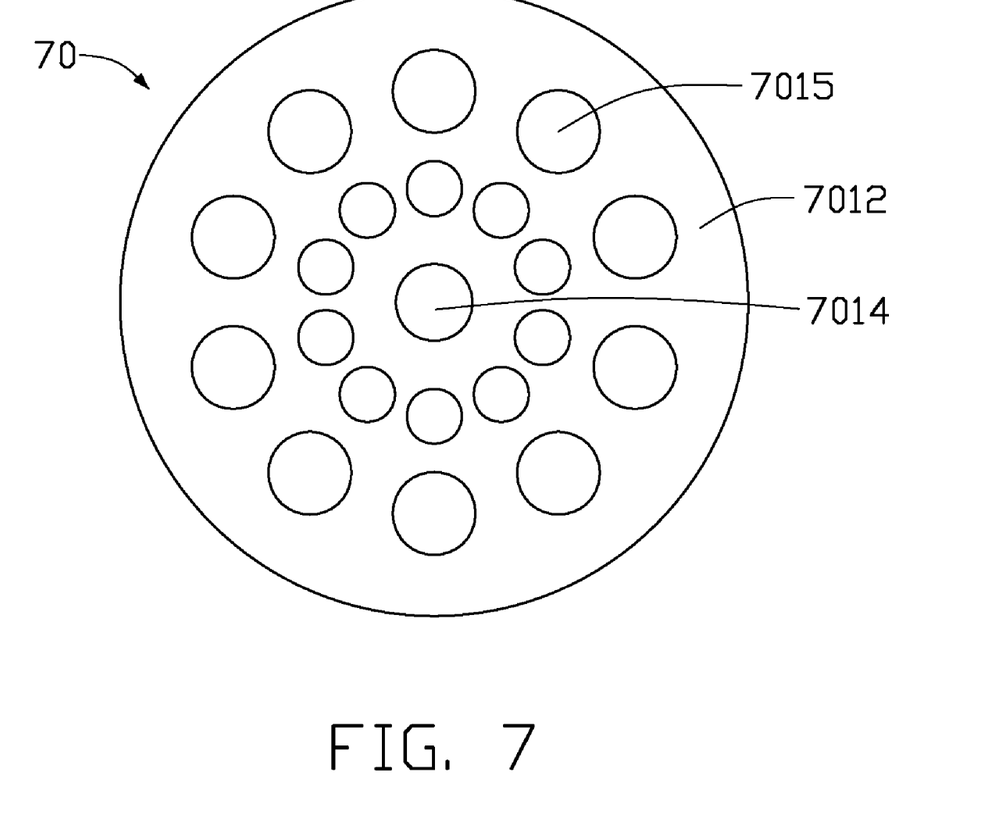
FIG. 7 is a top plane view of an optical plate according to a fourth preferred embodiment of the present invention.

Referring to FIG. 7, an optical plate 70 in accordance with a fourth preferred embodiment is shown. The optical plate 70 is similar in principle to the optical plate 20, except that a plurality of spherical depressions 7015 are formed on the light output surface 7012 surrounding a lamp-receiving portion 7014 in a circular manner. A diameter of each spherical depression 7015 increases with increasing distance from the lamp-receiving portion 7014. In the illustrated embodiment, the greater the distance between a particular spherical depression 7015 and the lamp-receiving portion 7014, the greater amount of light is adjusted by the particular spherical depression 7015. Thus, uniformity of the light exiting the optical plate is further improved. In other alternative embodiment, if the diameters of the spherical depressions 7015 are identical to each other, the same optical performance can be achieved by varying the distances between the spherical depressions 7015 from the lamp-receiving portion 7014.

Figure 8:
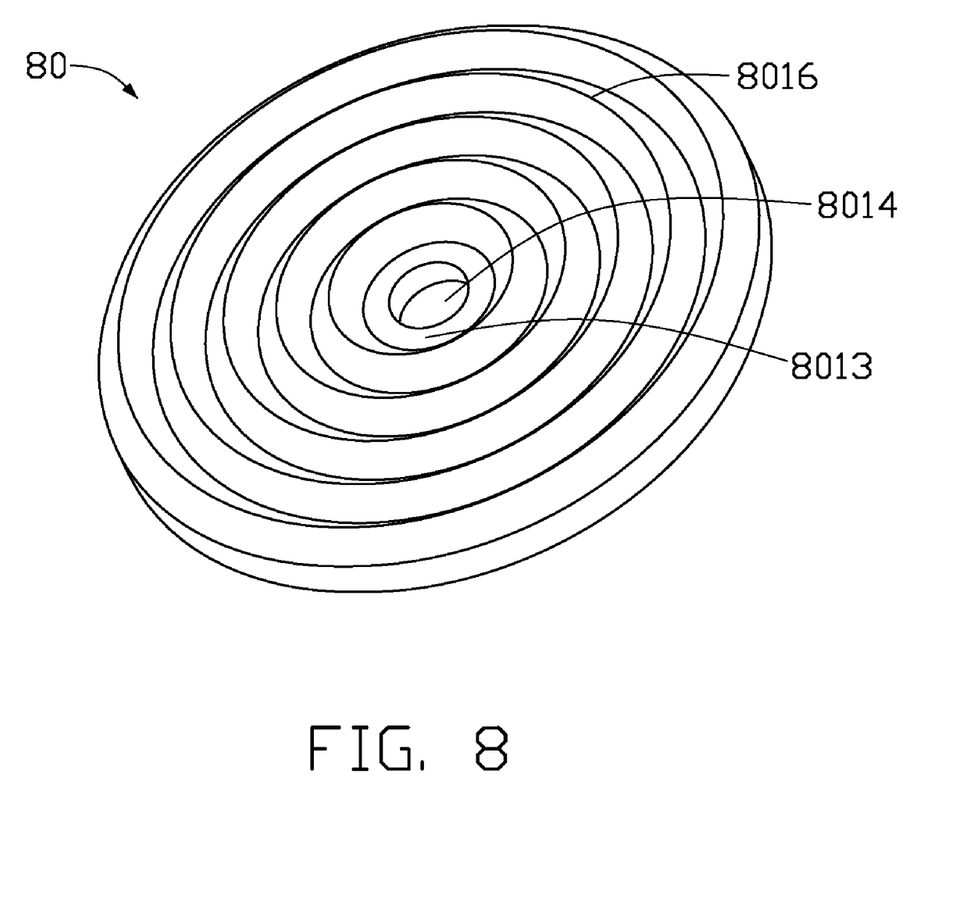
FIG. 8 is an isometric view of an optical plate according to a fifth preferred embodiment of the present invention.

Referring to FIG. 8, an optical plate 80 in accordance with a fifth preferred embodiment is shown. The optical plate 80 is similar in principle to the optical plate 20, a plurality of circular protrusions 8016 are formed on the bottom surface 8013. The square protrusion 8016 has a triangular structure on a cross section of a plane. Each square protrusion 8016 forms a substantially circular wall surrounding a lamp-receiving portion 8014.

Figure 9:
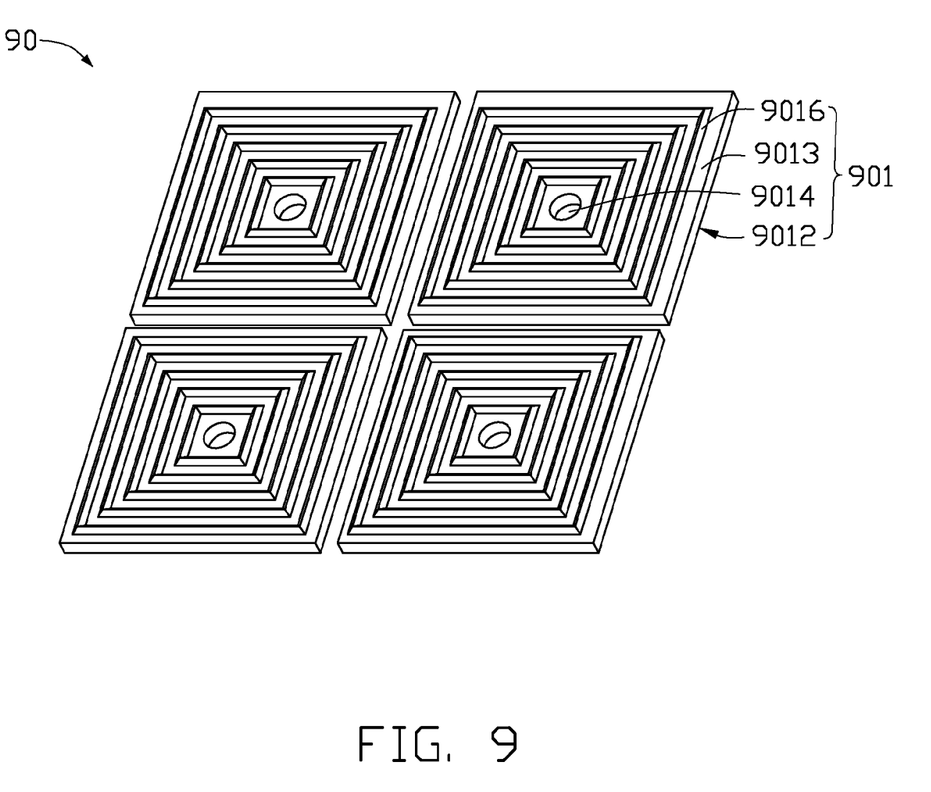
FIG. 9 is an isometric view of an optical plate according to a sixth preferred embodiment of the present invention.

Referring to FIG. 9, a combined optical plate 90 in accordance with a sixth preferred embodiment is shown. The combined optical plate 90 includes four transparent plate units 901 that can be combined together. Each transparent plate unit 901 is similar in principle to the optical plate 20. Each transparent plate section 901 includes a light output surface 9012, a bottom surface 9013 opposite to the light output surface 9012, a plurality of spherical depressions (not shown) are formed on the light output surface 9012, a plurality of square protrusions 9016 are formed in the bottom surface 9013, and a lamp-receiving portion 9014 communicating between the light output surface 9012 and the bottom surface 9013. Either spherical depressions (not shown) formed on light output surface 9012 or square protrusions 9016 formed on bottom surface 9013, are similar as those of the optical plate 20. In use, a plurality of LEDs and the combined optical plate 90 can be mounted into a housing to form a larger sized backlight module.

It should be noted that, the backlight module 200 is not limited to be configured with the optical plate 20 positioned in the housing 21 having the light output surface 2012 facing the light diffusion plate 23, but can also be configured with the optical plate 20 positioned in the housing 21 having the bottom surface 2013 facing the light diffusion plate 23. That is, the square protrusions 2016 are formed on a first surface of the optical plate 20, and the spherical depression 2015 are formed on a second surface of the optical plate 20. The first surface is selected from one of the light output surface 2012 and the bottom surface 2013, and the second surface is selected from the other one of the light output surface 2012 and the bottom surface 2013. However, if a lamp-receiving portion is a blind hole, a surface where the blind hole is defined must be a bottom surface and the other surface must be a light output surface. In addition, the protrusions formed on the light output surface is not limited to be circular protrusions and square protrusions, but can also be other enclosing V-shaped protrusions.

In the backlight module 200, a plurality of red, green, and blue colored LEDs can be inserted into the lamp-receiving portion 2014 of the optical plate 20, such that a blended white surface light can be obtained. It is to be understood that other kinds of point light source, such as field emission lamps and so on, can replace the LED 25 in above embodiments.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate unit having:
   a first surface;
   a second surface opposite to the first surface;
   a plurality of enclosing V-shaped protrusions formed on the first surface;
   a plurality of spherical depressions defined in the second surface; and
   at least a lamp-receiving portion defined in at least one of the first surface and the second surface, wherein each enclosing V-shaped protrusion forms a wall surrounding the at least one lamp-receiving portion.

2. The optical plate according to claim 1, wherein the wall is square.

3. The optical plate according to claim 1, wherein a pitch of adjacent enclosing V-shaped protrusions is configured to be in a range from about 0.025 millimeters to about 2 millimeters.

4. The optical plate according to claim 1, wherein a vertex angle of each of the enclosing V-shaped protrusions is configured to be in a range from about 60 degrees to about 120 degrees.

5. The optical plate according to claim 1, wherein at least one top edge of the enclosing V-shaped protrusions, and at least one bottom edge defined by the boundaries formed by the bases of adjacent enclosing V-shaped protrusions, are rounded.

6. The optical plate according to claim 1, wherein the spherical depressions are distributed on the second surface surrounding the lamp-receiving portion in a manner forming a rectangle around the lamp-receiving portion.

7. The optical plate according to claim 1, wherein the spherical depressions are distributed symmetrically with respect to the lamp-receiving portion.

8. The optical plate according to claim 1, a diameter of each spherical depression increases with increasing distance from the lamp-receiving portion.

9. The optical plate according to claim 1, wherein the lamp-receiving portion is selected from one of blind hole and through hole communicating between the first surface and the second surface.

10. The optical plate according to claim 1, wherein the optical plate comprises a plurality of the transparent plate units, the transparent plate units being tightly combined with each other.

11. A backlight module comprising:
a housing having a base and a plurality of sidewalls extending around a periphery of the base, the base and the sidewalls cooperatively forming an opening;
at least one point light source positioned on the base, each point light source having a light-emitting portion;
at least one reflective member is positioned above the top of the light-emitting portion;
an optical plate positioned in the housing, the optical plate including at least one transparent plate unit having:
a first surface;
a second surface opposite to the first surface;
a plurality of enclosing V-shaped protrusions formed on the first surface;
a plurality of spherical depressions formed in the second surface; and
a lamp-receiving portion defined in at least one of the first surface and the second surface, wherein each enclosing V-shaped protrusion forms a wall surrounding the lamp-receiving portion of the first surface, and the light-emitting portion of the at least one point light source is inserted in the lamp-receiving portion; and
a light diffusion plate positioned on the housing over the opening.

12. The backlight module according to claim 11, further comprising a light reflective plate defining a through hole therein, the light reflective plate being positioned underneath a bottom surface of the optical plate; and the light emitting potion of the point light source passing through the through hole of light reflective plate correspondingly.

13. The backlight module according to claim 12, wherein the light reflective plate further comprises a plurality of reflective sidewalls extending around a periphery thereof and contacting with the sidewalls of the housing.

14. The backlight module according to claim 11, wherein the housing is made of metal materials, and has high reflective inner surface.

15. The backlight module according to claim 11, further comprising a high reflective film deposited on inner surface of the base and the sidewalls of the housing.

16. The backlight module according to claim 11, further comprising a prism sheet positioned on the light diffusion plate.

17. The backlight module according to claim 11, wherein at least one top edge of the enclosing V-shaped protrusions, and at least one bottom edge defined by the boundaries formed by the bases of adjacent enclosing V-shaped protrusions, are rounded.

18. The backlight module according to claim 11, wherein the lamp-receiving portion is selected from one of blind hole and through hole communicating with the first surface and the second surface.

* * * * *